United States Patent
Beier et al.

(10) Patent No.: US 11,620,249 B2
(45) Date of Patent: Apr. 4, 2023

(54) LIN COMMUNICATION CIRCUIT AND A METHOD OF COMMUNICATING BETWEEN LIN BUSSES

(71) Applicant: Aptiv Technologies Limited, St. Michael (BB)

(72) Inventors: Ralf Anton Beier, Dublin (IE); Ralph-Heiner Haar, Dublin (IE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/808,415

(22) Filed: Jun. 23, 2022

(65) Prior Publication Data
US 2023/0004512 A1   Jan. 5, 2023

(30) Foreign Application Priority Data
Jun. 30, 2021 (EP) .................................. 21182844

(51) Int. Cl.
*G06F 13/40* (2006.01)
*G06F 13/362* (2006.01)
*G06F 13/42* (2006.01)

(52) U.S. Cl.
CPC .......... *G06F 13/405* (2013.01); *G06F 13/362* (2013.01); *G06F 13/4027* (2013.01); *G06F 13/4282* (2013.01)

(58) Field of Classification Search
CPC .... G06F 13/362; G06F 13/382; G06F 13/385; G06F 13/387; G06F 13/4027;
(Continued)

(56) References Cited

U.S. PATENT DOCUMENTS 6,003,105 A * 12/1999 Vicard ................ G06F 13/4045
                                                    710/314
6,748,473 B1 * 6/2004 Shatas ..................... H04L 67/10
                                                    710/305
(Continued)

FOREIGN PATENT DOCUMENTS

CN           112367236         2/2021

OTHER PUBLICATIONS

"LIN Specification Package". Revision 2.2A. Dec. 31, 2010. LIN Consortium. (Year: 2010).*
(Continued)

*Primary Examiner* — Thomas J. Cleary
(74) *Attorney, Agent, or Firm* — Colby Nipper PLLC

(57) ABSTRACT

In aspects, a Local Interconnect Network (LIN) communication circuit including a first LIN master associated with a first LIN bus and a second LIN master associated with a second LIN bus is disclosed. A data link is connected between the first and second LIN masters. A first mirroring client is established at the first LIN master for receiving message bits corresponding to a LIN message in a first slot on the first LIN bus and for transmitting the message bits bitwise over the data link. A second mirroring client is established at the second LIN master for receiving the message bits and transmitting them over the second LIN bus. The first and second LIN masters include synchronised schedule tables such that the message bits on the second LIN bus are transmitted in a corresponding slot to the first.

20 Claims, 1 Drawing Sheet

(58) Field of Classification Search
CPC .............. G06F 13/4045; G06F 13/405; G06F 13/4054; G06F 13/4282
See application file for complete search history.

(56) References Cited

U.S. PATENT DOCUMENTS

| | | | |
|---|---|---|---|
| 9,191,467 B2 | 11/2015 | Triess et al. | |
| 10,326,865 B2 | 6/2019 | Lennartsson | |
| 10,958,576 B2 | 3/2021 | Joshi et al. | |
| 2010/0049891 A1* | 2/2010 | Hartwich | H04J 3/0655 710/110 |
| 2010/0296478 A1* | 11/2010 | Hogenmueller | H04W 74/04 370/330 |
| 2013/0073764 A1* | 3/2013 | Deb | H04L 12/66 710/241 |
| 2014/0022912 A1* | 1/2014 | Kim | H04L 49/555 370/244 |
| 2014/0101351 A1* | 4/2014 | Hooper | G06F 13/364 710/110 |
| 2014/0133350 A1* | 5/2014 | Triess | H04L 9/40 370/254 |
| 2014/0247892 A1* | 9/2014 | Williams | H04B 3/54 375/257 |
| 2016/0080533 A1* | 3/2016 | Jeon | H04L 12/66 370/402 |
| 2016/0134553 A1 | 5/2016 | Kim | |
| 2019/0158310 A1* | 5/2019 | Hustava | H04L 12/40019 |
| 2019/0222407 A1 | 7/2019 | Yoshida et al. | |
| 2022/0078043 A1* | 3/2022 | Marcovitch | G06F 13/385 |
| 2022/0271970 A1* | 8/2022 | Newald | H04L 67/12 |

OTHER PUBLICATIONS

"Introduction to the Local Interconnect Network (LIN) Bus". National Instruments Corporation. Online Mar. 19, 2019. Retrieved from Internet Sep. 1, 2022. <https://www.ni.com/en-us/innovations/white-papers/09/introduction-to-the-local-interconnect-network--lin-bus.html>. (Year: 2019).*

"Extended European Search Report", EP Application No. 21182844.7, dated Dec. 2, 2021, 7 pages.

Garsten, "Aptiv To Unveil Open Platform Advanced Technology Architecture", https://www.forbes.com/sites/edgarsten/2012/12/02/aptiv-to-unveil-open-source-electronic-robocar-architecture/?sh=ed0c1e3686c4, Dec. 2, 2019, 6 pages.

* cited by examiner

LIN COMMUNICATION CIRCUIT AND A METHOD OF COMMUNICATING BETWEEN LIN BUSSES

INCORPORATION BY REFERENCE

This application claims priority to European Patent Application Number EP21182844.7, filed Jun. 30, 2021, the disclosure of which is incorporated by reference in its entirety.

BACKGROUND

LIN (Local Interconnect Network) bus is a low-cost serial network protocol used in vehicles to provide communications between components, such as windows, wipers and air conditioning controls. In most current vehicle EE architectures, LIN communications will typically be controlled from LIN masters within a small number of Electronic Control Units (ECUs). As a result, a large quantity of cabling is required between the ECUs and LIN slave nodes located around the vehicle. However, as the prevalence of electronics within vehicles increases, the cable harnesses required to establish these connections have become both larger and more complex.

More recently, there has been a shift toward zonal EE architectures, where a limited number of zone controllers or zonal gateways are used to support both power distribution and data connection requirements within a particular region of the vehicle. This has the potential to provide significant advantages in terms of reductions in complexity and wiring costs. However, LIN communications are difficult to implement within zonal architectures because of the changes that arise from transferring signals from a LIN slave in one zone to a LIN slave in another.

In this connection, under the LIN communication protocol, a LIN slave is only able to transmit messages to other LIN slaves within the same cluster (i.e., they share a common LIN master and are on a common LIN bus). As such, when different LIN masters are be provided in different vehicle zones, direct communications between physical LIN slaves in different zones are not possible. This creates issues where nodes in different zones relate to a function that would otherwise be served by a single LIN cluster.

Although it is possible to distribute LIN messages to different regions of the vehicle using the CAN bus, this doesn't address the above issue because the resultant communication is nevertheless between two separate physical LIN networks. As such, further additional complexities and costs are introduced to manage the communications between the different busses. For example, it becomes much more complex to initiate the control to wake-up a remote LIN network. These issues become even more complex because different nodes and ECUs may be designed and manufactured by different departments or entities, and may be used in different configurations in different vehicles. Consequently, even minor configuration changes can become very expensive. This therefore negates many of the advantages of using LIN bus in the first place.

The present disclosure is therefore directed to addressing issues with conventional arrangements.

SUMMARY

According to a first aspect there is provided a LIN communication circuit including: a first LIN master associated with a first LIN bus; a second LIN master associated with a second LIN bus; a data link connecting between the first and second LIN masters; a first mirroring client established at the first LIN master for receiving message bits corresponding to a LIN message in a first slot on the first LIN bus and transmitting the message bits bitwise over the data link; and a second mirroring client established at the second LIN master for receiving the message bits from the data link and transmitting the message bits over the second LIN bus, wherein the first and second LIN masters include first and second schedule tables respectively, and wherein the first and second schedule tables are synchronised such that the message bits transmitted on the second LIN bus are transmitted in a corresponding first slot to the first slot on the first LIN bus.

In this way, communication between different LIN clusters may be facilitated without needing to alter the configuration of the LIN slave nodes. This thereby allows standard, low cost LIN slaves to be used within a zonal EE architecture. That is, LIN slave nodes in different zones of a vehicle may convey information to each other through a data link, such as an ethernet, PCIe, or hardware cache coherent interconnect. This thereby allows LIN slaves to be effectively mirrored across one or more clusters without altering the LIN protocol.

In implementations, the circuit further includes a synchroniser for synchronising the first and second schedule tables. In implementations, the second schedule table is adjusted to specify a jitter time for the corresponding first slot which is longer than a jitter time for the first slot specified in the first schedule table. In this way, the time required to transmit data through the data link may, at least in part, be accommodated by adjusting the jitter specification in the second schedule table. The synchroniser may adjust the second schedule table, for example based on a preprogramed adjustment factor.

In implementations, the second schedule table is adjusted to specify an inter-byte space for the corresponding first slot which is longer than an inter-byte space specified for the first slot in the first schedule table. In this way, the time required to transmit data through the data link may, at least in part, be accommodated by adjusting the inter-byte space specification in the second schedule table.

In implementations, the circuit further includes a synchronisation link connecting between the first and second LIN masters for conveying schedule data for synchronising the first and second schedule tables. In implementations, the synchronisation link may be part of a ethernet, PCIe, or hardware cache coherent interconnect link between zones.

In implementations, the circuit further includes a first LIN slave node connected to the first LIN bus for transmitting the LIN message in the first slot in response to a message header in the first slot from the first LIN master. In this way, a standard LIN slave node may be used to transmit a message in the message field of the first slot, in response to receipt of an associated identifier in the header field of the first slot from the LIN master.

In implementations, the circuit further includes a second LIN slave node connected to the second LIN bus for receiving the LIN message in the corresponding first slot. In this way, a standard LIN slave node may receive the mirrored LIN message on the second LIN bus.

In implementations, at least one of the first and second LIN masters are Electronic Control Units (ECUs). In implementations, the LIN masters may be Zonal ECUs or Zonal Gateways for functioning as hubs for systems within a zone of a vehicle.

According to a second aspect there is provided a method of communicating between LIN busses, the method including: establishing a first mirroring client at a first LIN master associated with a first LIN bus; establishing a second mirroring client at a second LIN master associated with a second LIN bus; receiving, by the first mirroring client, message bits corresponding to a LIN message in a first slot on the first LIN bus and transmitting the message bits bitwise over a data link connecting between the first and second LIN masters; and receiving, by the second mirror client, the message bits from the data link and transmitting the message bits over the second LIN bus, wherein the first and second LIN masters include first and second schedule tables respectively, and wherein the first and second schedule tables are synchronised such that the message bits transmitted on the second LIN bus are transmitted in a corresponding first slot to the first slot on the first LIN bus.

In implementations, a jitter time specified in the second schedule table for the corresponding first slot is longer than a jitter time specified in the first schedule table for the first slot.

In implementations, the jitter time specified in the second schedule table for the corresponding first slot is a maximum defined jitter.

In implementations, an inter-byte space specified in the second schedule table for the corresponding first slot is longer than an inter-byte space specified in the first schedule table for the first slot.

In implementations, the method further includes the steps of: transmitting a message header in the first slot from the first LIN master, wherein the message header identifies a first LIN slave node; and transmitting the LIN message in the first slot from the first LIN slave node in response to the message header. In this way, a standard LIN protocol may be adhered to, with an identifier being transmitted from the LIN master in the header field of the first slot, and the LIN slave node transmitting its message in the message field of the same slot.

In implementations, the method further includes the steps of: transmitting a corresponding message header in the corresponding first slot from the second LIN master, wherein the corresponding message header identifies the first LIN slave node, and wherein the step of transmitting the message bits over the second LIN bus includes transmitting the LIN message from the second mirror client in the corresponding first slot. In this way, a standard LIN protocol may be replicated in the second LIN bus, with an identifier being transmitted from the LIN master in the header field of the corresponding first slot, and the second mirror client emulating the first LIN slave node by transmitting its message in the message field of the same slot.

In implementations, the step of transmitting the message bits bitwise over the data link includes bitwise slicing the LIN message by the first mirroring client, and multiplexing the sliced bits with other data. In this way, rather than delaying transmission until a complete protocol data unit has been received, the LIN message is sliced bitwise to allow constituent bits to be transmitted. In implementations, the bits are transmitted as a synchronous data signal.

In implementations, the method further includes the step of generating, by a virtual LIN slave node on the first LIN master, the message bits corresponding to the LIN message in a first slot on the first LIN bus. In this way, a LIN master may establish a virtual LIN slave node within its ECU environment and transmit messages from this virtual node to one or more other LIN busses.

BRIEF DESCRIPTION OF THE DRAWINGS

Illustrative implementations will now be described with reference to the accompanying drawings in which.

DETAILED DESCRIPTION

Figure 1:
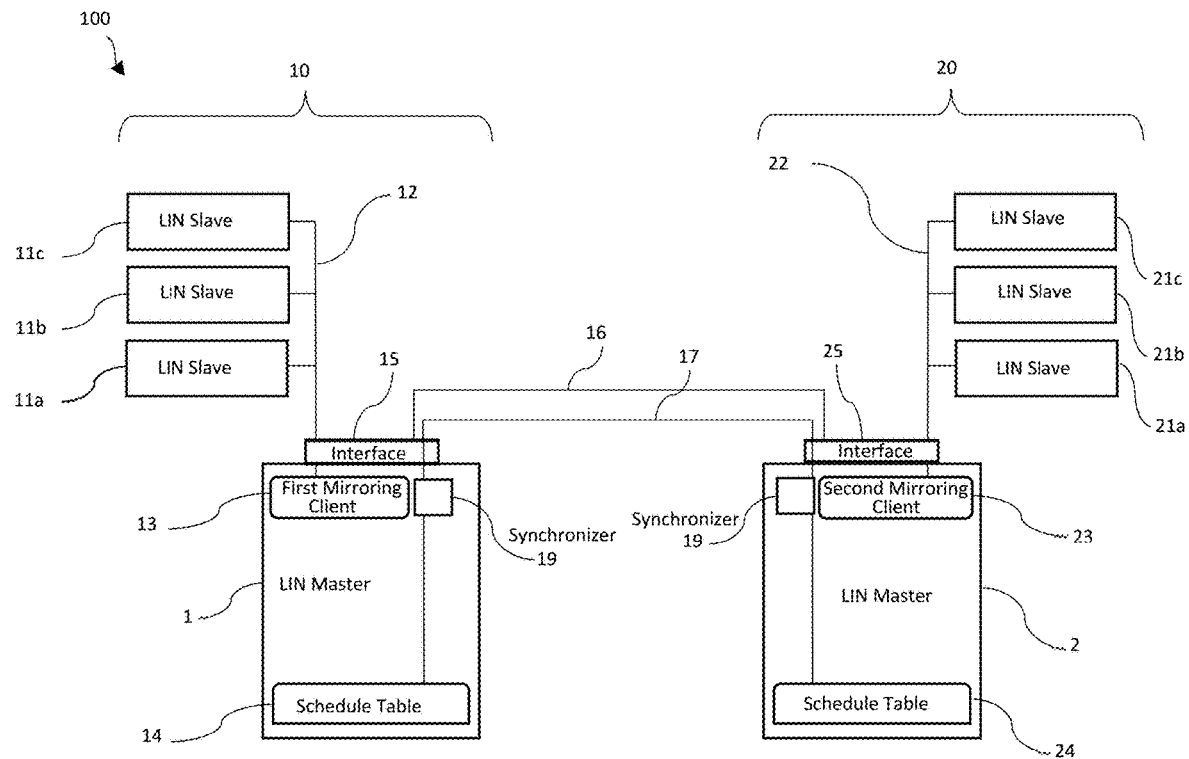
FIG. 1 shows a schematic communication circuit according to a first implementation.

FIG. 1 shows a first illustrative implementation of a communication circuit 100. The communication circuit 100 includes a first LIN cluster 10 and a second LIN cluster 20. Each of the clusters 10,20 are controlled by a respective first and second LIN master 1,2, with each master being provided as an electronic control unit in a different zone of the vehicle. As such, they are programmable zonal control units capable of implementing functions in addition to their master task functions on the LIN bus. They are also physically separated from each other.

Each LIN master 1,2 includes a schedule table 14,24 for managing the timing of frame slots and traffic control on their respective LIN bus. Each LIN master 1,2 is further provided with an interface 15,25 for connecting to a respective LIN line 12,22 which physically implements the LIN bus and is associated with a plurality of LIN slaves 11a-c, 21a-c. As such, the first and second groups of LIN slaves 11a-c,21a-c form the LIN cluster 10,20 with their respective first and second LIN masters 1,2. Communications on the first LIN line 12 from the first group of LIN slaves 11a-c are controlled by the first LIN master 1, and communications on the second LIN line 22 from the second group of LIN slaves 21a-c are controlled by the second LIN master 2.

A data link 16 and a synchronisation link 17 are further provided between the interfaces 15,25 of the first and second LIN masters 1,2. In this implementation, these links are provided through an Ethernet time-sensitive networking (TSN) connection. This thereby provides high speed communication between the LIN masters 1,2. In other implementations, other types of data link may be used, such as a Peripheral Component Interconnect Express (PCIe) or a Cache Coherent Interconnect. It will be appreciated that although the schematic illustration shows the data link 16 and synchronisation link 17 as two separate links, in practice the signals may be provided over a shared connection. For instance, they may be provided as different channels on a common communication line.

As mentioned above, the LIN masters 1,2 are electronic control units and are capable of establishing virtual LIN slaves internally for performing slave node functions in addition to their master task functions. As such, virtual LIN slaves may be implemented in software within the LIN masters 1,2, and the schedule tables 14,24 in each master may allocate slots for communications by the virtual LIN slaves on the LIN bus as if they were physical slaves connected to the respective LIN line. It will be appreciated that, by virtue of their implementation in software, the virtual LIN slaves may also perform additional functions, as is described in further detail below.

As shown in FIG. 1, the LIN masters 1,2 each implement a virtual LIN slave to function as first and second mirroring clients 13,23. The first and second mirroring clients 13,23 are communicatively connected over the data link 16.

The first mirroring client 13 in the first LIN master 1 is configured to read messages from the first LIN line 12 in a bitwise manner and transmit those data bits over the data link 16. That is, rather than reading and transmitting a complete LIN Protocol Data Unit (PDU), the first mirroring client 13 reads individual bits such that these bits are transferred over the data link 16. In implementations where a number of LIN clusters are provided in a single zone, the individual bits from multiple LIN clusters may be multiplexed together for transmission over the data link 16 along with other data generated by the zonal ECU. In this implementation, the other data includes data for safety and security mechanisms which is verified by the second LIN master 2 on receipt.

At the same time as the above, the second mirroring client 23 in the second LIN master 2 reads the bitwise data transmitted over the data link 16 and relays this over the second LIN line 22. As such, the second mirroring client 23 functions as a proxy for the respective first LIN slave whose message is conveyed over the data link 16.

In this connection, imagine a scenario where a first LIN slave 11*a* in the first LIN cluster 10 needs to transmit a message to a second LIN slave 21*a* in the second LIN cluster 20. The first LIN master 1 will initiate a message header including an identifier to prompt the first LIN slave 11*a* to transmit its message in the message field of the same slot on the first LIN line 12. This is received by the first mirroring client 13 and is transmitted over the data link 16. The second mirroring client 23 in the second LIN cluster 20 in turn transmits this over the second LIN line 22. As such, the second mirroring client 23 replicates the effect of the first LIN slave 11*a* existing on the second LIN line 22.

To facilitate the above, the first and second schedule tables 14,24 are synchronised such that the slot for the transmission of the first LIN slave 11*a*'s message exists in both the first and second clusters 10,20. The synchronisation is achieved through the synchronisation link 17, under the control of the synchroniser 19, which is implemented in the software of the first and second masters 1,2. Whilst synchronising the slots, the synchroniser 19 modifies the second schedule table 24 so that the jitter and inter-byte space for the slot containing the first LIN slave message field is adjusted to be closer to the maximum defined jitter and inter-byte space under the LIN specification. That is, if the determined time taken for the second mirroring client 23 to read and transmit a bit on the second LIN line 22 is, for instance, 56 µs, the second schedule table 24 may set the jitter to 100 µs. This thereby provides a 44 µs window in which a data bit may be transmitted over the data link 16 from the first LIN cluster 10 to the second LIN cluster 20 whilst still appearing in effectively the same slot. Accordingly, when the message is transmitted by the first LIN slave 11*a*, it will be at the start of the message field within the slot. On the receiving end, the data bits will be transmitted on the second LIN line 22 in a message field which is later in a slot corresponding to the first, as provided by the second schedule table 24. Accordingly, although there is a transmission delay as the data bits are relayed through the data link 16, this is absorbed by the redundancy built into the LIN protocol and provided by the jitter and inter-byte spaces. Consequently, from the perspective of the second slave device 21*a*, the received message will appear to have been transmitted from a slave node in the same cluster 20. Accordingly, even though the first slave device 11*a* is distributed in a different zone, it may be configured in the same way as if it were part of the second LIN cluster 20. This thereby allows standard LIN slave nodes to be easily utilised within a zonal architecture.

It will be understood that the second schedule table needs only to adjust timing within slots associated with LIN communications from other clusters. For communications within the same cluster, normal jitter and inter-byte spacing may be used.

The synchronisation link 17 allows the schedule tables 14,24 to be updated as needed to facilitate communications between other LIN slaves, both from the first cluster 10 to the second 20 and in the reverse.

To ensure that the LIN schedule tables 14,24 are synchronised, one of the tables is preselected as a master table, and the other schedule table is updated based on the master table. In other implementations, a consensus algorithm may be used to select the master table based on, for example, the LIN master with the shortest connections to connected LIN masters.

Error handling may be implemented using sporadic frames to prompt synchronous error checking.

Figure 2:
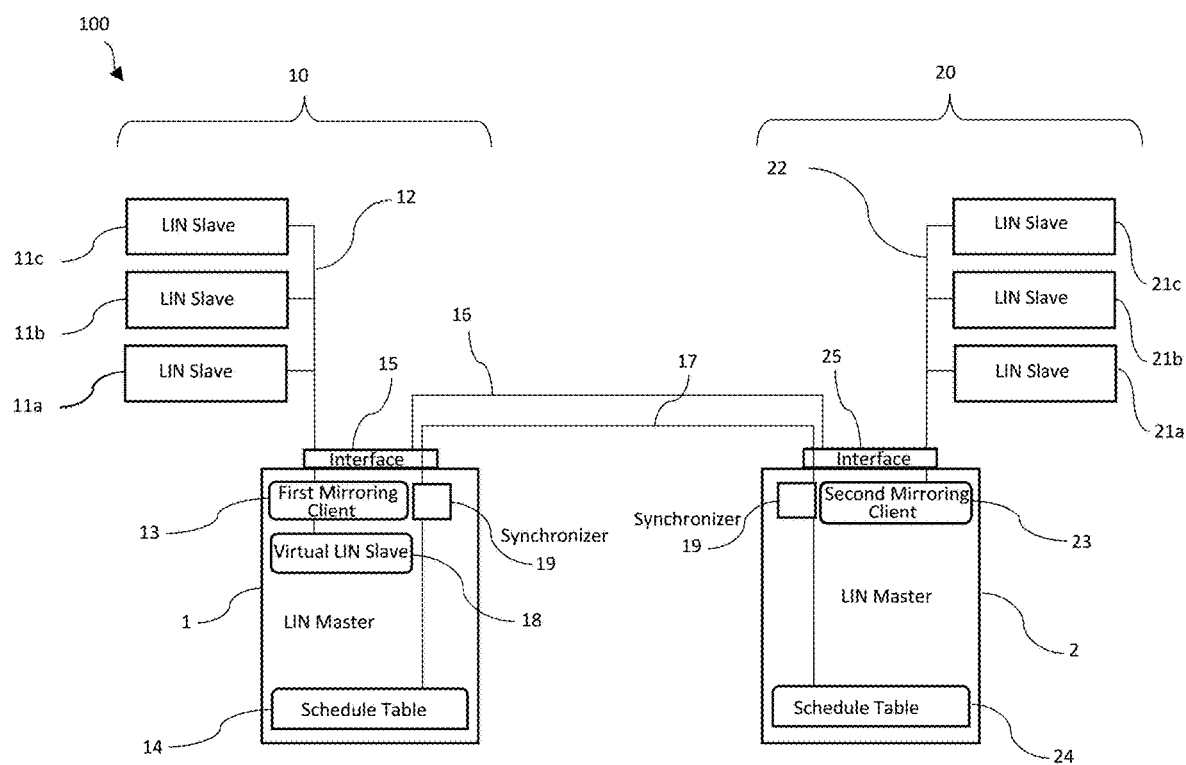
FIG. 2 shows a schematic communication circuit according to a second implementation.

The above arrangement also allows for the provision of virtual LIN slave nodes on one LIN master to communicate to a plurality of LIN clusters associated with different LIN Masters. In this respect, FIG. 2 shows a second implementation which is substantially identical to the first implementation except that a virtual LIN slave 18 is further provided in the first LIN master 1. As with the previous implementation, both the first and second LIN masters 1,2, implement mirroring clients 13,23. As before, the virtual LIN slave 18 is triggered by the schedule table 14 in the first LIN master, which prompts the virtual LIN slave 18 to transmit its message. This is then transferred via the mirroring clients 13,23 and the data link 16 to the second LIN cluster 20. In practice, it will be understood that the virtual LIN slave 18 may be located in another ECU device connected via the data link 16, with the scheduling tables being synchronised such that the virtual LIN slave 18 is triggered before the start of the corresponding slots allocated to the mirroring clients in the connected LIN clusters. As such, the respective connected LIN masters 2 will transmit the header and slave ID for the virtual LIN slave 18, with the transmission timing resulting in the mirroring clients 13,23 generating the message received by the virtual LIN slave 18 on their respective LIN line in the appropriate message field.

Accordingly, the above arrangements, communication between LIN clients in different zones of the vehicle may be facilitated without needing to alter the configuration of the LIN slave nodes. This thereby allows standard, low cost LIN slaves to be used within a zonal EE architecture.

It will be understood that the implementation illustrated above show applications only for the purposes of illustration. In practice, implementations may be applied to many different configurations, the detail of which being straightforward for those skilled in the art to implement.

What is claimed is:

1. A Local Interconnect Network (LIN) communication circuit comprising:
    a first LIN master associated with a first LIN bus;
    a second LIN master associated with a second LIN bus;
    a data link connecting between the first and second LIN masters;
    a first mirroring client established at the first LIN master for receiving message bits corresponding to a LIN message in a first slot on the first LIN bus and transmitting the message bits bitwise over the data link; and a second mirroring client established at the second LIN master for receiving the message bits from the data link and transmitting the message bits over the second LIN bus, wherein the first and second LIN masters comprise first and second schedule tables respectively, and wherein the first and second schedule tables are synchronised such that the message bits transmitted on the second LIN bus are transmitted in a first slot on the second LIN bus corresponding to the first slot on the first LIN bus, the second schedule table adjusted such that at least one of a jitter or an inter-byte space is adjusted based on a LIN specification.

2. A LIN communication circuit according to claim 1, further comprising a synchroniser for synchronising the first and second schedule tables, the second schedule table is adjusted to specify a jitter time for the first slot on the second LIN bus which is longer than a jitter time for the first slot specified in the first schedule table.

3. A LIN communication circuit according to claim 1, wherein the second schedule table is adjusted to specify an inter-byte space for the first slot on the second LIN bus which is longer than an inter-byte space specified for the first slot in the first schedule table.

4. A LIN communication circuit according to claim 1, further comprising a synchronisation link connecting between the first and second LIN masters for conveying schedule data for synchronising the first and second schedule tables.

5. A LIN communication circuit according to claim 1, further comprising a first LIN slave node connected to the first LIN bus for transmitting the LIN message in the first slot in response to a message header in the first slot from the first LIN master.

6. A LIN communication circuit according to claim 1, further comprising a second LIN slave node connected to the second LIN bus for receiving the LIN message in the first slot on the second LIN bus.

7. A LIN communication circuit according to claim 1, wherein at least one of the first and second LIN masters are Electronic Control Units.

8. A method of communicating between LIN busses, the method comprising:
  establishing a first mirroring client at a first LIN master associated with a first LIN bus;
  establishing a second mirroring client at a second LIN master associated with a second LIN bus;
  receiving, by the first mirroring client, message bits corresponding to a LIN message in a first slot on the first LIN bus and transmitting the message bits bitwise over a data link connecting between the first and second LIN masters; and
  receiving, by the second mirror client, the message bits from the data link and transmitting the message bits over the second LIN bus, wherein the first and second LIN masters comprise first and second schedule tables respectively, and wherein the first and second schedule tables are synchronised such that the message bits transmitted on the second LIN bus are transmitted in a first slot on the second LIN bus corresponding to the first slot on the first LIN bus, the second schedule table adjusted such that at least one of a jitter or an inter-byte space is adjusted based on a LIN specification.

9. The method according to claim 8, wherein a jitter time specified in the second schedule table for the first slot on the second LIN bus is longer than a jitter time specified in the first schedule table for the first slot.

10. The method according to claim 9, wherein the jitter time specified in the second schedule table for the first slot on the second LIN bus is a maximum defined jitter.

11. The method according to claim 8, wherein an inter-byte space specified in the second schedule table for the first slot on the second LIN bus is longer than an inter-byte space specified in the first schedule table for the first slot.

12. The method according to claim 8, further comprising:
  transmitting a message header in the first slot from the first LIN master, the message header identifying a first LIN slave node; and
  transmitting the LIN message in the first slot from the first LIN slave node in response to the message header.

13. The method according to claim 8, further comprising:
  transmitting a corresponding message header in the first slot on the second LIN bus from the second LIN master, the corresponding message header identifying a first LIN slave node, transmitting the message bits over the second LIN bus comprises transmitting the LIN message from the second mirror client in the first slot on the second LIN bus.

14. The method according to claim 8, wherein the step of transmitting the message bits bitwise over the data link comprises bitwise slicing the LIN message by the first mirroring client, and multiplexing the sliced bits with other data.

15. The method according to claim 8, further comprising:
  generating, by a virtual LIN slave node on the first LIN master, the message bits corresponding to the LIN message in a first slot on the first LIN bus.

16. A Local Interconnect Network (LIN) communication circuit comprising:
  a first LIN master associated with a first LIN bus;
  a second LIN master associated with a second LIN bus;
  a data link connecting between the first and second LIN masters;
  a first mirroring client established at the first LIN master for receiving message bits corresponding to a LIN message in a first slot on the first LIN bus and transmitting the message bits bitwise over the data link;
  a second mirroring client established at the second LIN master for receiving the message bits from the data link and transmitting the message bits over the second LIN bus, wherein the first and second LIN masters comprise first and second schedule tables respectively; and
  a synchroniser for synchronising the first and second schedule tables such that the message bits transmitted on the second LIN bus are transmitted in a first slot on the second LIN bus corresponding to the first slot on the first LIN bus, the second schedule table adjusted to specify a jitter time for the first slot which is longer than a jitter time for the first slot specified in the first schedule table.

17. A LIN communication circuit according to claim 16, further comprising a synchronisation link connecting between the first and second LIN masters for conveying schedule data for synchronising the first and second schedule tables.

18. A LIN communication circuit according to claim 16, further comprising a first LIN slave node connected to the first LIN bus for transmitting the LIN message in the first slot in response to a message header in the first slot from the first LIN master.

19. A LIN communication circuit according to claim 16, further comprising a second LIN slave node connected to the second LIN bus for receiving the LIN message in the first slot on the second LIN bus.

20. A LIN communication circuit according to claim 16, wherein at least one of the first and second LIN masters are Electronic Control Units.

\* \* \* \* \*